(12) United States Patent
Hiraoka et al.

(10) Patent No.: US 9,226,486 B2
(45) Date of Patent: Jan. 5, 2016

(54) SPINNING REEL AND SPINNING REEL SPOOL

(71) Applicant: Shimano Inc., Sakai, Osaka (JP)

(72) Inventors: Hirokazu Hiraoka, Osaka (JP); Takuji Takamatsu, Osaka (JP); Keigo Kitajima, Osaka (JP); Kouji Ochiai, Osaka (JP); Akihiko Sato, Osaka (JP)

(73) Assignee: Shimano Inc., Osaka (JP)

( * ) Notice: Subject to any disclaimer, the term of this patent is extended or adjusted under 35 U.S.C. 154(b) by 23 days.

(21) Appl. No.: 14/045,139

(22) Filed: Oct. 3, 2013

(65) Prior Publication Data

US 2014/0175206 A1 Jun. 26, 2014

(30) Foreign Application Priority Data

Dec. 20, 2012 (JP) ................................. 2012-277878

(51) Int. Cl.
*A01K 89/01* (2006.01)
(52) U.S. Cl.
CPC .................................. *A01K 89/0111* (2013.01)
(58) Field of Classification Search
USPC .................................................. 242/322, 318
See application file for complete search history.

(56) References Cited

U.S. PATENT DOCUMENTS

| 6,431,483 | B2 * | 8/2002 | Takikura et al. | ............... | 242/322 |
|---|---|---|---|---|---|
| 2001/0054661 | A1 * | 12/2001 | Takikura et al. | ............... | 242/322 |
| 2002/0088889 | A1 | 7/2002 | Morise et al. | | |
| 2008/0142628 | A1 * | 6/2008 | Kitajima et al. | ............... | 242/322 |
| 2009/0166460 | A1 * | 7/2009 | Kitajima | ....................... | 242/322 |
| 2011/0042500 | A1 * | 2/2011 | Saito | ............................ | 242/224 |
| 2011/0180646 | A1 * | 7/2011 | Hiraoka | ....................... | 242/241 |

FOREIGN PATENT DOCUMENTS

| JP | 2003-259772 A | 9/2003 |
|---|---|---|
| JP | 2008-283931 A | 11/2008 |
| JP | 2010-227007 A | 10/2010 |

OTHER PUBLICATIONS

European Search Report of corresponding EP Application No. 13 19 2761.8 dated Mar. 20, 2014.

\* cited by examiner

*Primary Examiner* — Emmanuel M Marcelo
(74) *Attorney, Agent, or Firm* — Global IP Counselors

(57) ABSTRACT

A spinning reel spool according to a first aspect of the present invention is a spinning reel spool that delivers fishing line forward. The spinning reel spool comprises a spool body and a ring member. This spool body has a body portion and a protruding portion. The protruding portion is integrally formed on a front side of the body portion. The protruding portion is annularly arranged and protrudes from the body portion in an axial direction of the spool body. The ring member is disposed on an outer circumferential portion of the protruding portion of the spool body. The ring member is held between the body portion and a plastically deformed part of the protruding portion.

11 Claims, 9 Drawing Sheets

SPINNING REEL AND SPINNING REEL SPOOL

CROSS-REFERENCE TO RELATED APPLICATIONS

This application claims priority to Japanese Patent Application No. 2012-277878, filed on Dec. 20, 2012. The entire disclosure of Japanese Patent Application No. 2012-277878 is hereby incorporated herein by reference.

BACKGROUND

1. Field of the Invention

The present invention relates to a spinning reel that delivers fishing line forward and a spool of a spinning reel.

2. Background Information

The conventional spinning reel comprises a spool body, an abutting member (a spool collar), and a ring member (a spool ring). In this type of spinning reel, the ring member is held between the abutting member and the spool body. Specifically, the ring member is held between the abutting member and the spool body by mounting the abutting member to the spool body in a state of having disposed the ring member on the front side of the spool body. See, for example, Japanese Laid-open Patent Publication No. 2008-283931.

SUMMARY

In the conventional configuration, the ring member is held between the abutting member and the spool body. In this configuration, a space (a closed space) surrounded by the spool body, the abutting member (a spool collar), and the ring member (a spool ring) is formed in the outer circumferential portion at the front portion of the spool. Therefore, once a foreign substance such as seawater or the like infiltrates this closed space, there is a concern that the spool body may corrode from the effect of the foreign substance. Namely, there is a concern that the durability of the spool body may degrade.

Also, the abutting member makes contact with the ring member while pressing the ring member. Therefore, if the abutting member is formed from a resin or the like to achieve reduction in the weight of the spool, there is a concern, depending on the material that was selected, that the abutting member may be deformed or broken by the stress generated in the abutting member.

The present invention was made with consideration given to the problems described above, and the object of the present invention is to enhance the durability of the spool.

A spinning reel spool according to a first aspect of the present invention is a spinning reel spool that delivers fishing line forward. The spinning reel spool comprises a spool body and a ring member. This spool body has a body portion and a protruding portion. The protruding portion is integrally formed on a front side of the body portion. The protruding portion is annularly arranged and protrudes from the body portion in an axial direction of the spool body. The ring member is disposed on an outer circumferential portion of the protruding portion of the spool body. The ring member is held between the body portion and a plastically deformed part of the protruding portion.

In this spool, the ring member is held between the plastically deformed part of the protruding portion and the body portion by plastically deforming at least one portion of the protruding portion of the spool body according to a pressing force. Therefore, in this configuration, the spool collar (the abutting member) is made unnecessary. Namely, in this case, a closed space is not formed. Therefore, corrosion of the spool body can be prevented. Namely, the durability of the spool can be enhanced in the present invention.

On the other hand, if the spool collar (the abutting member) is not used as a member for fixing the ring member to the spool body and is used simply as a lid member for covering the front portion of the spool body, putting the spool collar in contact with the ring member is not necessary. Therefore, the space surrounded by the spool collar, the ring member, and the spool body does not form a closed space. As a result, foreign substances such as seawater or the like are not likely to be retained in this space (which is not a closed space), and corrosion of the spool body can be suppressed. Namely, the durability of the spool can be enhanced with the present invention.

Also, in the case when the spool collar is used as a lid member, the spool collar does not need to press the ring member. Therefore, a reactive force is not received from the ring member. As a result, even if the spool collar is formed from a resin or the like, it is possible to prevent the deformation or breaking of the spool collar caused by stress. Namely, the durability of the spool can be enhanced with the present invention.

The spinning reel spool according to a second aspect of the present invention relates to the spinning reel spool according to the first aspect of the present invention, wherein one of the ring member and the spool body has a concave portion. The other of the ring member and the spool body has an engaging part that engages the concave portion to limit rotation of the ring member relative to the spool body.

In this case, the engaging part in either the ring member or the spool body engages the concave portion in the other of the ring member and the spool body. Accordingly, the rotation of the ring member relative to the spool body is regulated. Namely, by having the engaging part engage the concave portion, the rotation of the ring member relative to the spool body can be easily regulated.

The spinning reel spool according to a third aspect of the present invention relates to the spinning reel spool according to the second aspect of the present invention, wherein the ring member includes an inner circumferential portion having the concave portion, and the engaging part is a part of the plastically deformed part of the protruding portion to limit rotation of the ring member relative to the spool body.

In this case, the plastically deformed portion of the spool body (the annular portion) is engaged with the concave portion of the ring member. Accordingly, the rotation of the ring member relative to the spool body is regulated. Namely, the rotation of the ring member relative to the spool body can be regulated when the spool body (the annular portion) is plastically deformed.

The spinning reel spool according to a fourth aspect of the present invention relates to the spinning reel spool according to the second aspect of the present invention, wherein the spool body includes the concave portion, and the engaging part is a projection of the ring member that engages the concave portion.

In this case, the convex portion of the ring member engages the concave portion of the spool body. Accordingly, the rotation of the ring member relative to the spool body is regulated. Namely, by disposing the convex portion of the ring member in the concave portion of the spool body and plastically deforming the spool body (the annular portion), the rotation of the ring member relative to the spool body can be regulated.

The spinning reel spool according to fifth aspect of the present invention relates to the spinning reel spool according to any one of the first to the fourth aspects of the present invention, wherein the outer circumferential surface of the protruding portion has a groove that is located at a position forwardly spaced from the body portion by a prescribed amount.

In this case, a groove portion is formed on the outer circumferential surface of the protruding portion. Specifically, this groove is formed on the outer circumferential surface of the protruding portion at a position forwardly spaced apart from the body portion by a prescribed amount. By forming a groove in the outer circumferential surface of the protruding portion as described above, the protruding portion can easily be plastically deformed on the outer circumferential side with this groove acting as a reference point for controlled deformation.

The spinning reel spool according to a sixth aspect of the present invention relates to the spinning reel spool according to any one of the first to the fifth aspects of the present invention, wherein the protruding portion has an inner circumferential surface that is obtusely angled with respect to a front surface of the body portion that extends radially inward toward a center axis of the spinning reel spool.

In this case, the angle formed from the inner circumferential surface of the protruding portion and the front surface of the body portion is obtuse. In other words, a thickness in the radial direction at the extreme end portion of the protruding portion is less than a thickness in the radial direction at the base end portion of the protruding portion. Accordingly, the extreme end portion of the protruding portion can be easily plastically deformed.

The spinning reel spool according to a seventh aspect of the present invention relates to the spinning reel spool according to any one of the first to the sixth aspects of the present invention, wherein the body portion has a first section extends radially inward toward a center axis of the spinning reel spool from the protruding portion, and a second section extends radially outward away from the center axis of the spinning reel spool from the protruding portion. The first section has a first thickness as measured in the axial direction. The second section has a second thickness as measured in the axial direction. The first thickness is greater than the second thickness.

In this case, the thickness in the first section on the radially inward side of the body portion is greater than the thickness at the second section on the radially outward side of the body portion with the annular portion as reference. Accordingly, deformation, for example out-of-plane deformation, of the first section on the radially inward side of the body portion can be prevented when a pressing force is applied to the protruding portion.

The spinning reel spool according to an eighth aspect of the present invention relates to the spool according to any one of the first to the seventh aspects of the present invention, wherein the ring member is fixed to the spool body by the plastically deformed part, which is only partially disposed along the protruding portion.

In this case, the ring member can easily be fixed to the spool body just by deforming at least one portion of the protruding portion.

The spinning reel according to the ninth aspect of the present invention includes the spinning reel spool discussed above and further comprises a reel body, a handle and a rotor. The handle is rotatably mounted to the reel body. The rotor is operatively coupled between the handle and the spool to wind fishing line on the spool. In this spinning reel, the spool has enhancing durability.

According to the present invention, the durability of the spinning reel spool can be enhanced.

Other objects, features, aspects and advantages of the disclosed spinning reel will become apparent to those skilled in the art from the following detailed description, which, taken in conjunction with the annexed drawings, discloses preferred embodiments of the spinning reel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
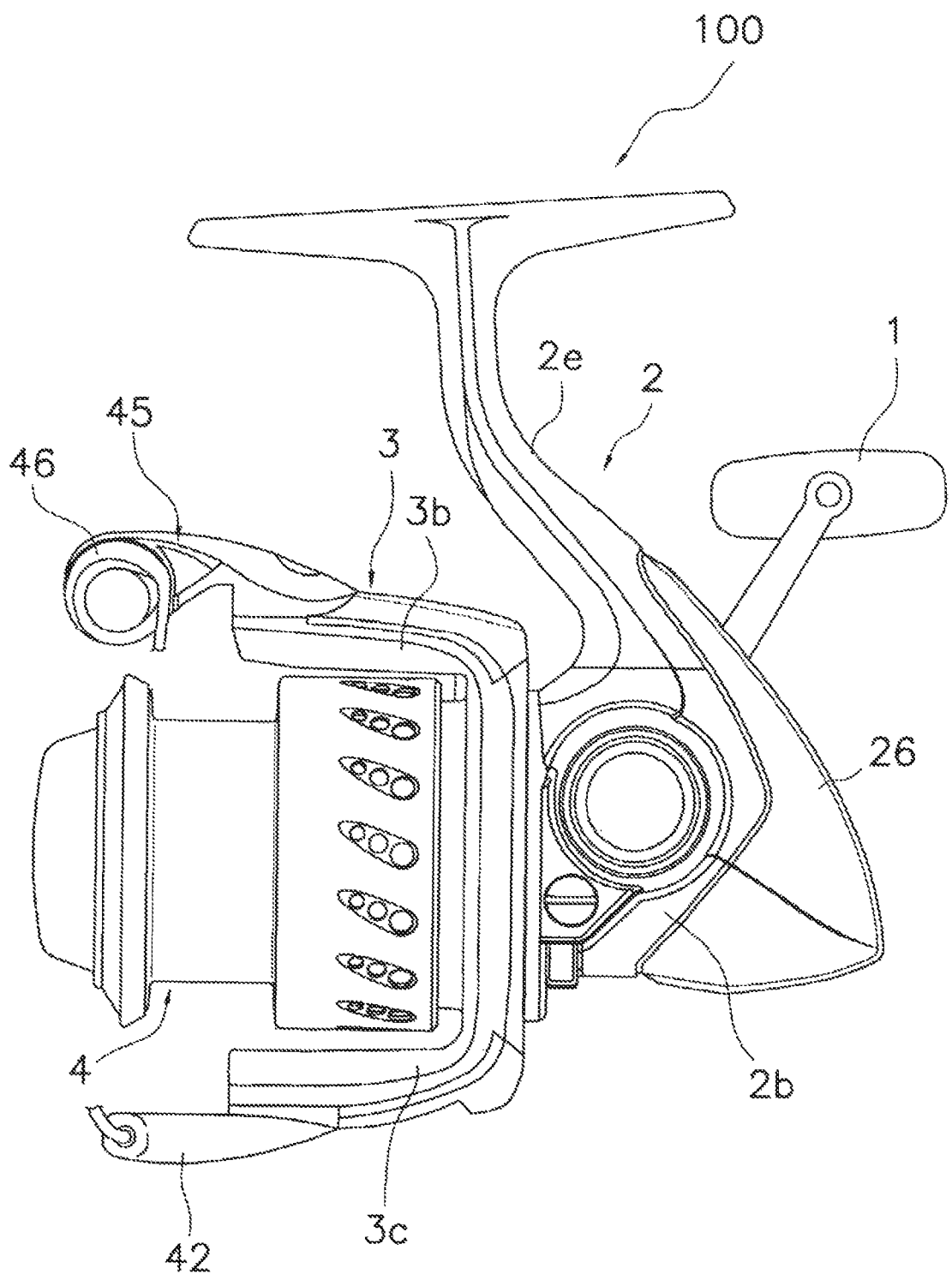
FIG. 1 is a side elevational view of a spinning reel according to a first embodiment of the present invention.
Figure 2:
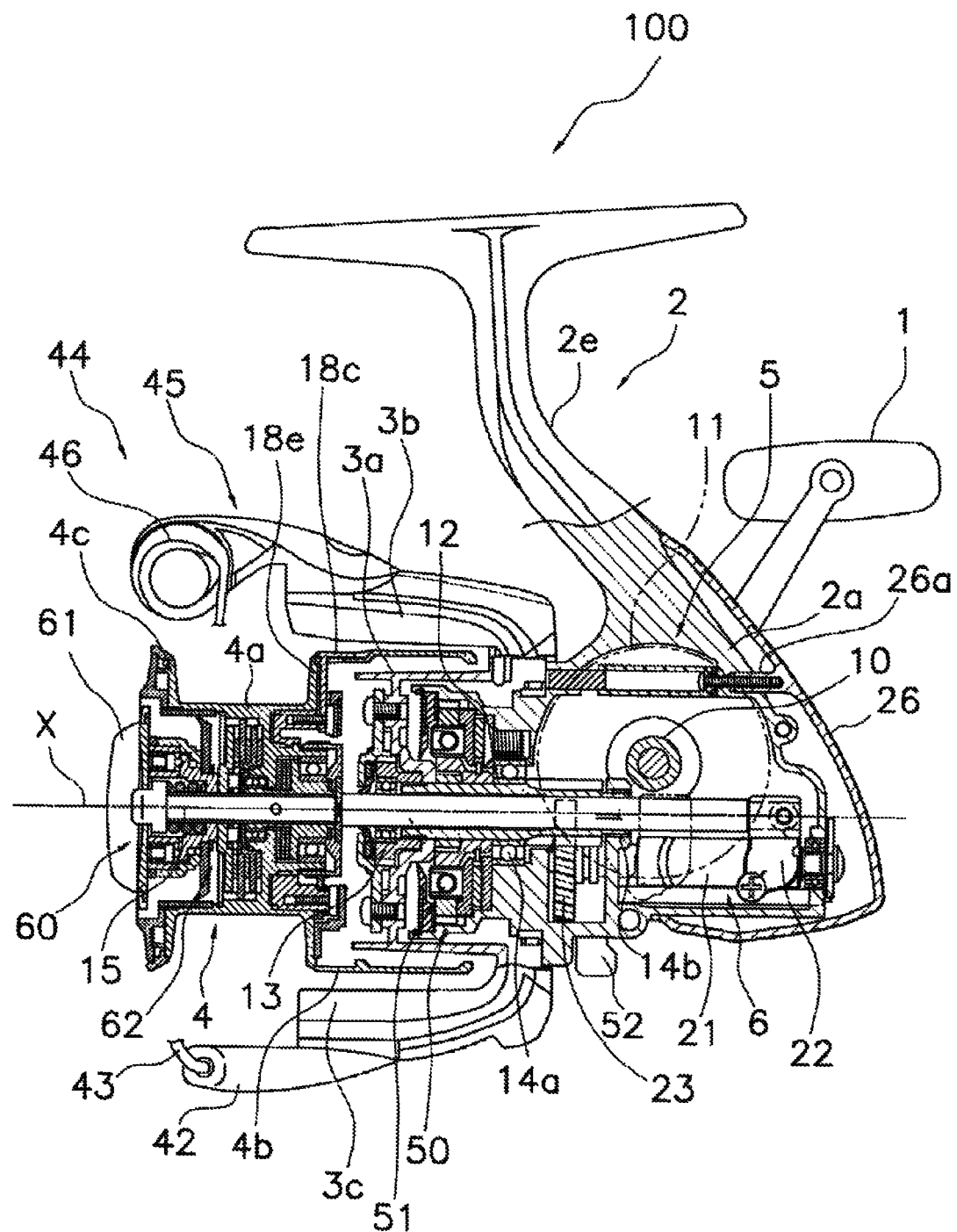
FIG. 2 is a cross-sectional elevational side view of the spinning reel of FIG. 1.

As illustrated in FIG. 1, the spinning reel 100 according to the first embodiment of the present invention is a reel capable of delivering fishing line forward. As illustrated in FIGS. 1 and 2, the spinning reel 100 basically comprises a handle 1, a reel body 2, a rotor 3, and a spinning reel spool 4. The handle I is rotatably mounted to the reel body 2. The handle 1 can be mounted on either the right side or the left side of the reel body 2.

As seen in FIG. 2, the reel body 2 includes a housing portion 2a, a lid member 2b and a guard member 26. The housing portion 2a has an opening at one side portion. The lid member 2b covers the opening at the side portion of the housing portion 2a. The guard member 26 is mounted to the rear portion of the housing portion 2a. The reel body 2 further includes a T-shaped fishing rod mounting portion 2e that extends in the longitudinal direction. The T-shaped fishing rod mounting portion 2e is integrally formed on the top portion of the housing portion 2a. As illustrated in FIG. 2, a rotor drive mechanism 5 and an oscillating mechanism 6 are installed inside of the housing portion 2a. The front portion of the housing portion 2a is open. The lid member 2b is detachably mounted to the housing portion 2a to cover the opening at the side portion of the housing portion 2a. The lid member 2b is fixed to the housing portion 2a with, for example, a fastening bolt that is not illustrated in the drawings.

The guard member 26 is a member that is mounted from the rear to cover the housing portion 2a and the lid member 2b. The guard member 26 is fixed to the housing portion 2a, for example, via a boss portion 26a, The guard member 26 determines the external shape of the rear portion of the reel body 2. For appearance, the guard member 26 is mounted to a rear portion of the housing portion 2a that includes the fishing rod mounting portion 2e and the lid member 2b via the packing not illustrated in the drawing.

The rotor 3 is rotatably supported at the front portion of the reel body 2. Specifically, the rotor 3 is integrally and rotatably coupled to the pinion gear 12 to be described later. The rotor 3 can be switched between a rotation prohibiting state and a rotation allowing state according to an anti-reverse mechanism 50. The anti-reverse mechanism 50 is, for example, a roller-type one-way clutch 51. This switching operation is carried out according to a switch lever 52 that is disposed at the bottom portion of the reel body 2.

The rotor 3 basically comprises a cylindrical portion 3a, a first rotor arm 3b, and a second rotor arm 3c. The cylindrical portion 3a, the first rotor arm 3b, and the second rotor arm 3c are integrally formed. The first rotor arm 3b and the second rotor arm 3c are disposed at the sides of the cylindrical portion 3a to diametrically oppose each other. The rotor 3 is provided with a bail arm 44 that guides fishing line to the spool 4.

The bail arm 44 includes a first bail support member 45 that is pivotally mounted on the outer circumferential side at the extreme end of the first rotor arm 3b. The bail arm 44 also includes a second bail support member 42 that is pivotally mounted on the inner circumferential side at the extreme end of the second rotor arm 3c. A line roller 46 is mounted at the extreme end of the first bail support member 45 for guiding fishing line to the spool 4.

The bail arm 44 further includes a bail 43 that is a made from a wire which was curved roughly into a U-shape. The bail 43 is fixed between the line roller 46 at the extreme end of the first bail support member 45 and the second bail support member 42. Thus, the bail arm 44 includes the first bail support member 45, the second bail support member 42, the line roller 46 and the bail 43. The bail arm 44 can pivot between a fishing line guide position and a fishing line release position as illustrated in FIG. 2.

The spool 4 is used for winding fishing line on the outer circumferential surface. The spool 4 is disposed at the front portion of the rotor 3 to move in the longitudinal direction. The spool 4 is integrally formed. The spool 4 is disposed between the first rotor arm 3b and the second rotor arm 3c of the rotor 3. The spool 4 is mounted to the extreme end of the spool shaft 15 via a drag mechanism 60. Reference symbol X in FIG. 2 indicates a longitudinal axis of the shaft center of the spool shaft 15. Thus, the reference symbol X in FIG. 2 also represents a center axis of the spool 4.

Figure 3:
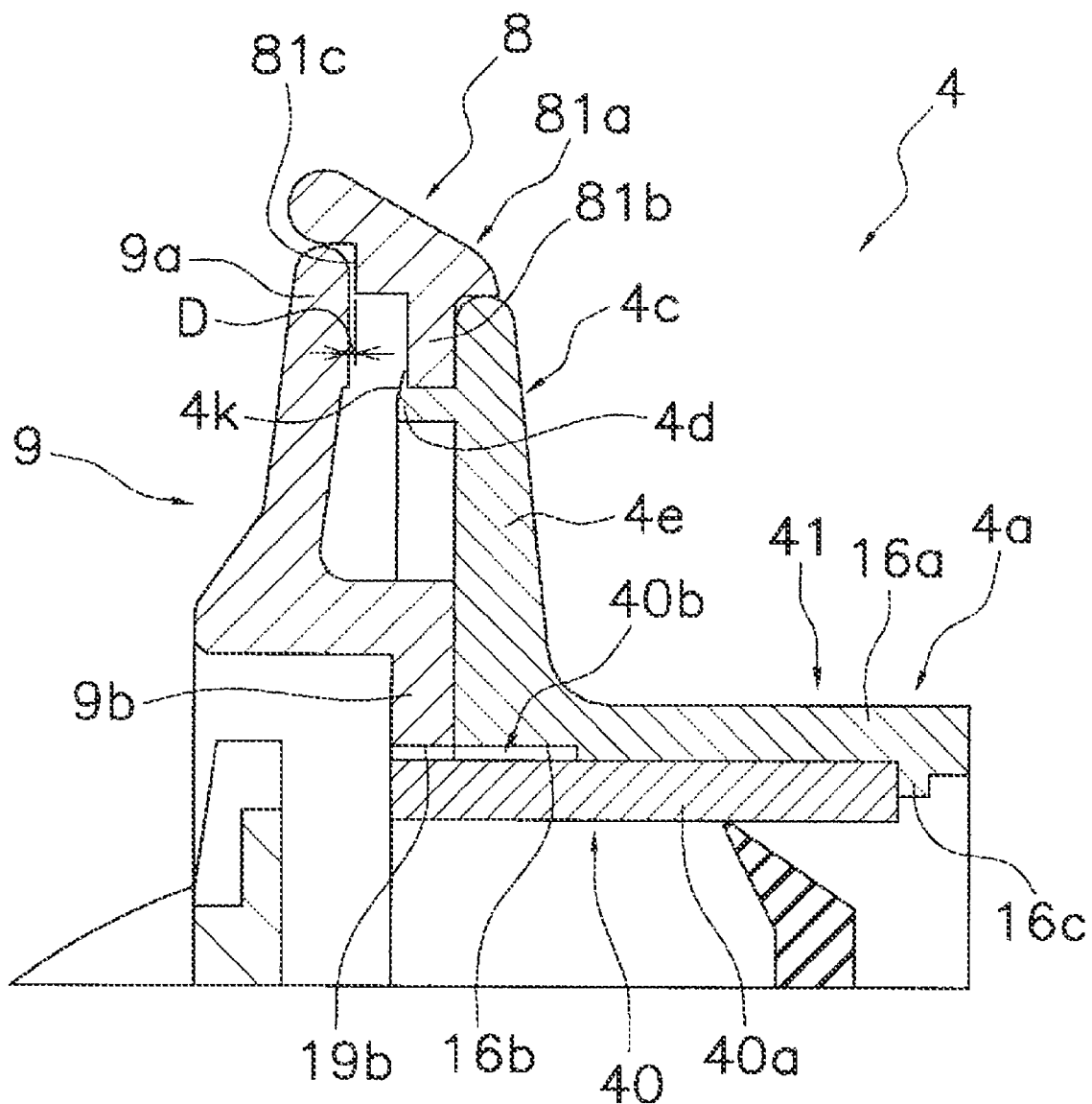
FIG. 3 is a enlarged partial view of a spool of the spinning reel.

As illustrated in FIG. 3, the spool 4 includes a coupling portion 40, a spool body 41, a ring member 8 and a fastening member 9.

The coupling portion 40 is a member for coupling the spool body 41 and the fastening member 9 together. The coupling portion 40 has a cylindrical body portion 40a and a male threaded portion 40b. The male threaded portion 40b is formed on the outer circumference at one end of the body portion 40a. Specifically, the male threaded portion 40b is formed on the outer circumference of the body portion 40a and extends from the front end portion to the center portion of the body portion 40a.

The spool body 41 includes a fishing line winding drum portion 4a, a skirt portion 4b (see FIG. 2), a front flange portion 4c and an annular protrusion 4d (one example of an annular portion). As seen in FIGS. 2 and 3, the fishing line winding drum portion 4a, the skirt portion 4b (see FIG. 2), the front flange portion 4c and the annular protrusion 4d are integrally formed as a one-piece member. Fishing line is wound on the outer circumferential surface of the fishing line winding drum portion 4a. Here, the body portion of the spool body 41 is formed by the fishing line winding drum portion 4a, the skirt portion 4b (refer to FIG. 2), and the front flange portion 4c.

The fishing line winding drum portion 4a is disposed on the outer circumference of the coupling portion 40 while being screwed to the male threaded portion 40b of the coupling portion 40. The fishing line winding drum portion 4a has a cylindrical portion 16a, a first female threaded portion 16b and a positioning portion 16c. The cylindrical portion 16a is formed into a cylindrical shape. The first female threaded portion 16b is formed at the front end portion of the fishing line winding drum portion 4a on the inner circumference of the fishing line winding drum portion 4a. More specifically, the first female threaded portion 16b is formed on the inner circumference side at the front end portion of the cylindrical portion 16a. The first female threaded portion 16b is screwed to the center portion of the male threaded portion 40b of the coupling portion 40. The positioning portion 16c is used for positioning the coupling portion 40. The positioning portion 16c is integrally formed with the spool body 41 while protruding inward from the inner circumferential portion of the cylindrical portion 16a. The rear end portion of the coupling portion 40 contacts the positioning portion 16c.

As illustrated in FIG. 2, the skirt portion 4b is integrally formed on the fishing line winding drum portion 4a to cover the cylindrical portion 3a of the rotor 3. Specifically, the skirt portion 4b is integrally formed on the fishing line winding drum portion 4a at the rear of the fishing line winding drum portion 4a. This skirt portion 4b is formed into a cylindrical shape. The skirt portion 4b includes a rear flange portion 18e and a cylindrical portion 18c that protrudes rearward from the extreme end portion of the rear flange portion 18e. The rear flange portion 18e protrudes radially outward from the rear end portion of the fishing line winding drum portion 4a to have substantially the same length as the radial length of the front flange portion 4c.

As illustrated in FIGS. 2 and 3, the front flange portion 4c extends radially outward from the front portion of the fishing line winding drum portion 4a. In other words, the front flange portion 4c is formed to have a larger diameter than that of the fishing line winding drum portion 4a and is disposed at the front end of the fishing line winding drum portion 4a.

The front flange portion 4c has a body portion 4e and an annular protrusion 4d. The body portion 4e protrudes radially outward from the front end portion of the fishing line winding drum portion 4a. The body portion 4e is integrally formed on the fishing line winding drum portion 4a. The body portion 4e is smoothly connected to the front end portion of the fishing line winding drum portion 4a.

The annular protrusion 4d is integrally formed on the front side of the body portion 4e of the front flange portion 4c. Specifically, the annular protrusion 4d protrudes forward from the body portion 4e of the front flange portion 4c. The annular protrusion 4d is plastically deformable part. Specifically, at least one portion of the annular protrusion 4d is plastically deformed according to a pressing force. More specifically, at least one portion of the annular protrusion 4d is deformed according to a pressing force. Hereafter, the section (the plastically deformed section) where the annular protrusion 4d was deformed will be referred to as the deformed part 4k (one example of the plastically deformed part, and one example of the engaging part). The deformed part 4k engages a pair of concave portions 8a (refer to FIGS. 4 and 5 to be described later) of the ring member 8. The ring member 8 is disposed on the outer circumferential portion of the annular protrusion 4d.

The ring member 8 is for guiding fishing line forward. Specifically, the ring member 8 is held between the deformed part 4k of the annular protrusion 4d and the front flange portion 4c (the body portion 4e) by deforming the annular protrusion 4d in a state of having disposed the ring member 8 on the outer circumferential portion of the annular protrusion 4d. The ring member 8 is held by the section of the deformed part 4k that is not engaging the concave portion 8a. Accordingly, the ring member 8 is fixed to the front flange portion 4c (the spool body 41).

Figure 4:
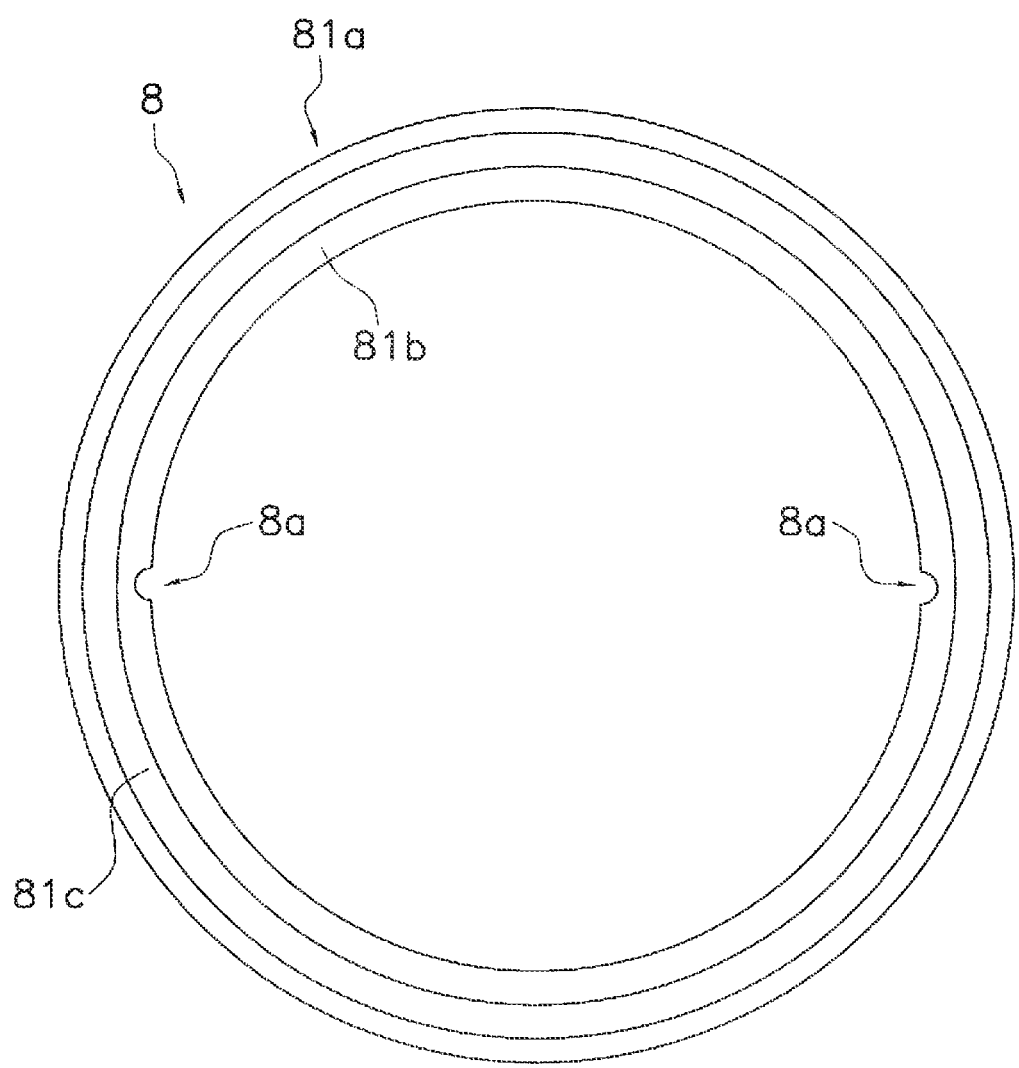
FIG. 4 is a front view of a ring member of the spinning reel spool.
Figure 5:
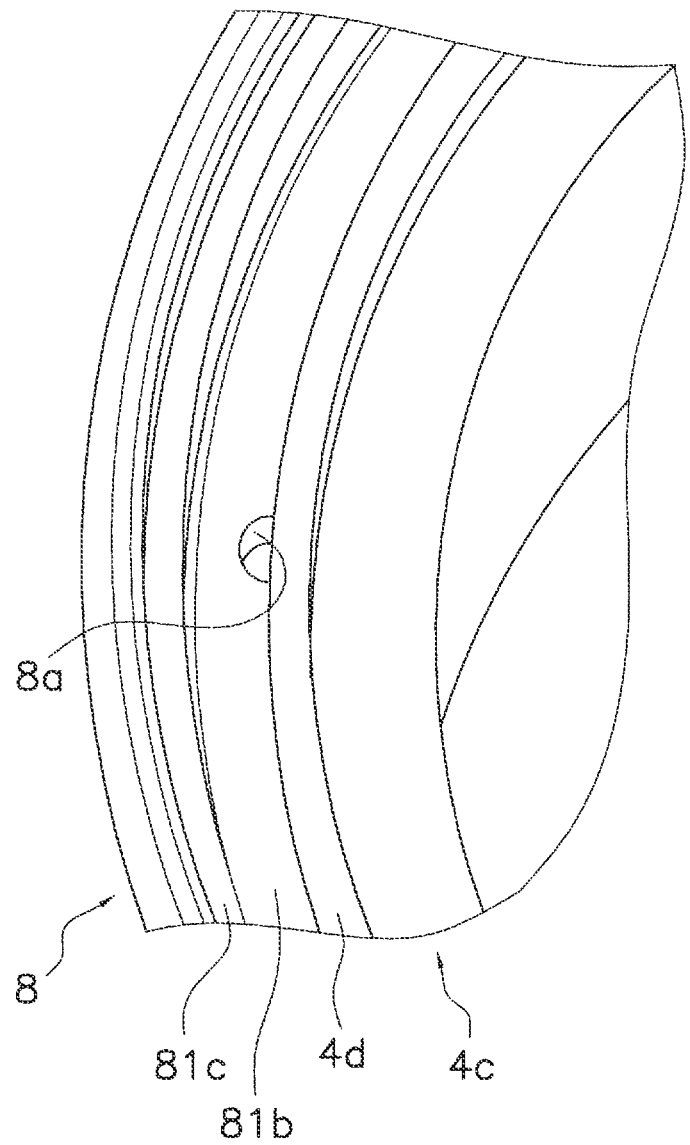
FIG. 5 is a front perspective view showing a state in which the ring member is disposed on a front flange of the spinning reel spool.

Here, the configuration of the ring member 8 will be described in detail. As illustrated in FIGS. 3 through 5, the ring member 8 has a body portion 81a, a protruding portion 81b, and a step portion 81c. The body portion 81a is formed into an annular shape. The protruding portion 81b is integrally formed on the inner circumferential side of the body portion 81a. The protruding portion 81b is formed into an annular shape. Specifically, the protruding portion 81b is formed such that the thickness of the protruding portion 81b (the thickness in the axial direction, the direction along the spool shaft 15) is made to be less than the protruding height of the annular protrusion 4d before the plastic deformation. The annular protrusion 4d of the front flange portion 4c is disposed at the extreme end portion of the protruding portion 81b, and the annular protrusion 4d of the front flange portion 4c is engaged with the protruding portion 81b. Specifically, the extreme end portion of the protruding portion 81b is held between the body portion 4e of the front flange portion 4c and the deformed part 4k of the annular portion 4d of the front flange portion 4c.

The protruding portion 81b has a concave portion 8a. The concave portion 8a is formed on the inner circumferential portion (the extreme end portion) of the protruding portion 81b. Specifically, two concave portions 8a are formed on the inner circumferential portion of the protruding portion 81b. The two concave portions 8a are formed on the inner circumferential portion of the protruding portion 81b to diametrically oppose each other. The deformed part 4k of the annular protrusion 4d engages the concave portion 8a when the annular protrusion 4d by the concave portion 8a is deformed in a state wherein the protruding portion 81b has been disposed to the outer circumferential portion of the annular protrusion 4d. Accordingly, the rotation of the ring member 8 relative to the spool body 41 is regulated. Also, an effect of fixing the ring member 8 to the front flange portion 4c (the spool body 41) can be expected when the deformed part 4k of the annular protrusion 4d is engaged with the concave portions 8a. Here, an example was shown of a case wherein two concave portions 8a are formed. However, all that is necessary is to have at least one concave portion 8a.

The step portion 81c is formed on the outer circumferential portion of the body portion 81a. The outer circumferential portion (the outer circumferential portion of a tilted portion 9a to be described later) of the fastening member 9 is disposed at the step portion 81c. More specifically, the outer circumferential portion of the fastening member 9 is disposed at the step portion 81c to form a space D (refer to FIG. 3) between the step portion 81c and the outer circumferential portion (the outer circumferential portion of the tilted portion 9a to be described later) of the fastening member 9.

Here, an example in which a space D is formed between the step portion 81c and the outer circumferential portion of the fastening member 9 was described. However, forming this space D is not always necessary if the force with which the outer circumferential portion of the fastening member 9 presses the step portion 81c is small. In a case wherein the space D is not formed, the ring member 8 and/or the fastening member 9 is formed such that the outer circumferential portion of the fastening member 9 is not deformed by the force pressing the step portion 81c.

The fastening member 9 is disposed on the front side of the fishing line winding drum portion 4a. Also, the fastening member 9 is disposed on the front side of the front flange portion 4c. The fastening member 9 makes contact with the front side of the fishing line winding drum portion 4a on the outer circumference of the coupling portion 40 while being screwed to the male threaded potion 40b of the coupling portion 40. The fastening member 9 includes an abutting portion 9b and the tilted portion 9a. The abutting portion 9b is the section that makes contact with the fishing line winding drum portion 4a. The abutting portion 9b is formed into a cylindrical shape.

The abutting portion 9b has a second female threaded portion 19b. The second female threaded portion 19b is formed on the inner circumferential surface of the abutting portion 9b. The second female threaded portion 19b is screwed to the front end side of the male threaded portion 40b of the coupling portion 40. Accordingly, the abutting portion 9b makes contact with the front side of the fishing line winding drum portion 4a on the outer circumference of the coupling portion 40. More specifically, the abutting portion 9b makes contact with the front side of the front flange portion 4c on the outer circumference of the coupling portion 40. When the second female threaded portion 19b is mounted to the male threaded portion 40b of the coupling portion 40 as was described above, the first female threaded portion 16b and the second female threaded portion 19b are screwed to the male threaded portion 40b in a state wherein the first female threaded portion 16b and the second female threaded portion 19b are connected.

The tilted portion 9a is integrally formed on the outer circumferential portion of the abutting portion 9b. Specifically, the tilted portion 9a is formed to protrude radially outward from the abutting portion 9b such that the fastening member 9 increases in diameter from the front side to the rear side. The outer circumferential portion of the tilted portion 9a is disposed on the front side of the ring member 8. Here, the space D is formed between the outer circumferential portion of the tilted portion 9a and the front side of the ring member 8. The rear end portion of a drag control knob 61 to be described later is housed in the inner circumferential portion of the fastening member 9.

As illustrated in FIG. 2, the drag mechanism 60 is a mechanism for braking the rotation of the spool 4 and includes the drag control knob 61 that is screwed to the extreme end of the spool shaft 15 and a brake portion 62 that is pressed by the drag control knob 61 and applies a braking force to the spool 4.

The rotor drive mechanism 5 drives the rotor 3. The rotor drive mechanism 5 includes a drive shaft 10, a drive gear 11 and a pinion gear 12. The drive shaft 10 is rotatably supported to the reel body 2 according to a bearing not illustrated in the drawings. A handle 1 is fixed to the drive shaft 10. The drive gear 11 is provided to be integral to the drive shaft 10 or to be a separate member from the drive shaft 10. Here, the drive gear 11 is in the form of a face gear. The pinion gear 12 is a member that interlocks with the drive gear 11. The pinion gear 12 is formed into a cylindrical shape, and the front portion of the pinion gear 12 penetrates the center portion of the rotor 3 and is fixed to the rotor 3 via a nut 13. Also, the middle portion and the rear end portion in the axial direction of the pinion gear 12 are rotatably supported by the reel body 2 via the respective bearings 14a and 14b.

The oscillating mechanism 6 drives the spool 4. The oscillating mechanism 6 is a mechanism for moving the spool shaft 15 coupled to the center portion of the spool 4 in the longitudinal direction via the drag mechanisms 60 while moving the spool 4 in the same direction. The oscillating mechanism 6 comprises a traverse camshaft 21, a slider 22, and a middle gear 23. The traverse camshaft 21 is arranged below the spool shaft 15 to be parallel to the spool shaft 15. The slider 22 moves in the longitudinal direction along the traverse camshaft 21. The rear end of the spool shaft 15 is non-rotatably fixed to the slider 22. The middle gear 23 is fixed to the extreme end of the traverse camshaft 21. The middle gear 23 interlocks with the pinion gear 12.

Assembly of the Front Portion of the Spool

Here, the procedure for assembling the front portion of the spool 4 will be described. First, the ring member 8 is disposed on the front side of the front flange portion 4c of the spool body 41. Specifically, the ring member 8 is disposed on the outer circumferential portion of the annular portion 4d on the front side of the front flange portion 4c of the spool body 41.

Next, a pressing force is applied to the annular protrusion 4d in the state described above, and the annular protrusion 4d is deformed whereupon the ring member 8 is held between the deformed part 4k of the annular protrusion 4d and the front flange portion 4c. Specifically, the deformed part 4k that does not engage the concave portion 8a of the ring member 8 is used to fix the ring member 8 to the spool body 41 (the front flange portion 4c). On the other hand, the deformed part 4k that engages the concave portion 8a of the ring member 8 is used primarily for regulating the rotation of the ring member 8 relative to the spool body 41. Also, the deformed part 4k that engages the concave portion 8a of the ring member 8 is used to fix the ring member 8 to the spool body 41 (the front flange portion 4c).

Summary (1) The spool 4 of the spinning reel 100 in the first embodiment is a reel that delivers fishing line in the forward direction. This spool 4 includes a spool body 41 and a ring member 8. The spool body 41 has a body portion (the fishing line winding drum portion 4a, the skirt portion 4b, and the front flange portion 4c) and an annular protrusion 4d. The annular protrusion 4d is integrally formed on the front side of the body portion 4a, 4b, and 4c, for example, on the front side of the front flange portion 4c. The annular protrusion 4d is plastically deformable. The ring member 8 is disposed on the outer circumferential portion of the annular protrusion 4d. The ring member 8 is held between the deformed part 4k (the plastically deformed portion) of the annular protrusion 4d and the front flange portion 4c by plastically deforming at least one portion (the deformed part 4k) of the annular protrusion 4d by applying a pressing force.

In the spool 4 of the first embodiment, the fastening member 9 is not used as a member for fastening the ring member 8 to the spool body 41 but instead is used as a lid member that covers the front portion of the spool body 41. Therefore, the fastening member 9 does not need to make contact with the ring member 8. Namely, the space surrounded by the fastening member 9, the ring member 8, and the spool body 41 does not form a closed space. As a result, a foreign substance such as seawater or the like is not likely to be retained in this space (not a closed space), and corrosion of the spool body 41 can be suppressed. Namely, with this spool 4, the durability of the spool 4 can be enhanced.

Also, in the case when the fastening member 9 is used as a lid member, the fastening member 9 does not need to press the ring member 8. Therefore, a reactive force is not received from the ring member 8. As a result, even if the fastening member 9 is formed with a resin or the like, it is possible to prevent the deformation or breaking of the fastening member 9. Namely, in this spool 4, the durability of the spool can be enhanced.

(2) In the spool 4 of the spinning reel 100 in the first embodiment, the ring member 8 has a concave portion 8a. The concave portion 8a is formed on the inner circumferential portion of the ring member 8. The spool body 41 has a deformed part 4k that engages each of the concave portions 8a. By having the deformed part 4k engage the concave portions 8a, the rotation of the ring member 8 relative to the spool body 41 is regulated.

In this case, the deformed part 4k of the spool body 41 engages the concave portions 8a of the ring member 8. Accordingly, the rotation of the ring member 8 relative to the spool body 41 is regulated. Namely, the rotation of the ring member 8 and the fixation of the ring member 8 relative to the spool body 41 can be controlled concurrently just by having the deformed part 4k engage the deformed part 4k concave portions 8a.

(3) As mentioned above, the spinning reel 100 in the first embodiment basically comprises the reel body 2, the handle 1, the rotor 3 and the spool 4. The handle 1 is rotatably mounted to the reel body 2. The rotor 3 rotates by interlocking with the operation of the handle 1. Fishing line is wound on the spool 4 according to the rotation of the rotor 3.

In the spinning reel 100 of the first embodiment, the durability of the spool 4 can be enhanced.

Second Embodiment

The spinning reel 200 according to the second embodiment in the present invention is a reel that can deliver fishing line in the forward direction. The spinning reel 200 according to the second embodiment has the same configuration as that of the spinning reel 100 described in the first embodiment except for the configuration of the spool 104. Therefore, the description of the configuration that is the same as that of the spinning reel 100 in the first embodiment will be omitted. Only the configuration that varies from the spinning reel 100 in the first embodiment will be described. Refer to the description in the first embodiment for sections where the description has been omitted.

Figure 6:
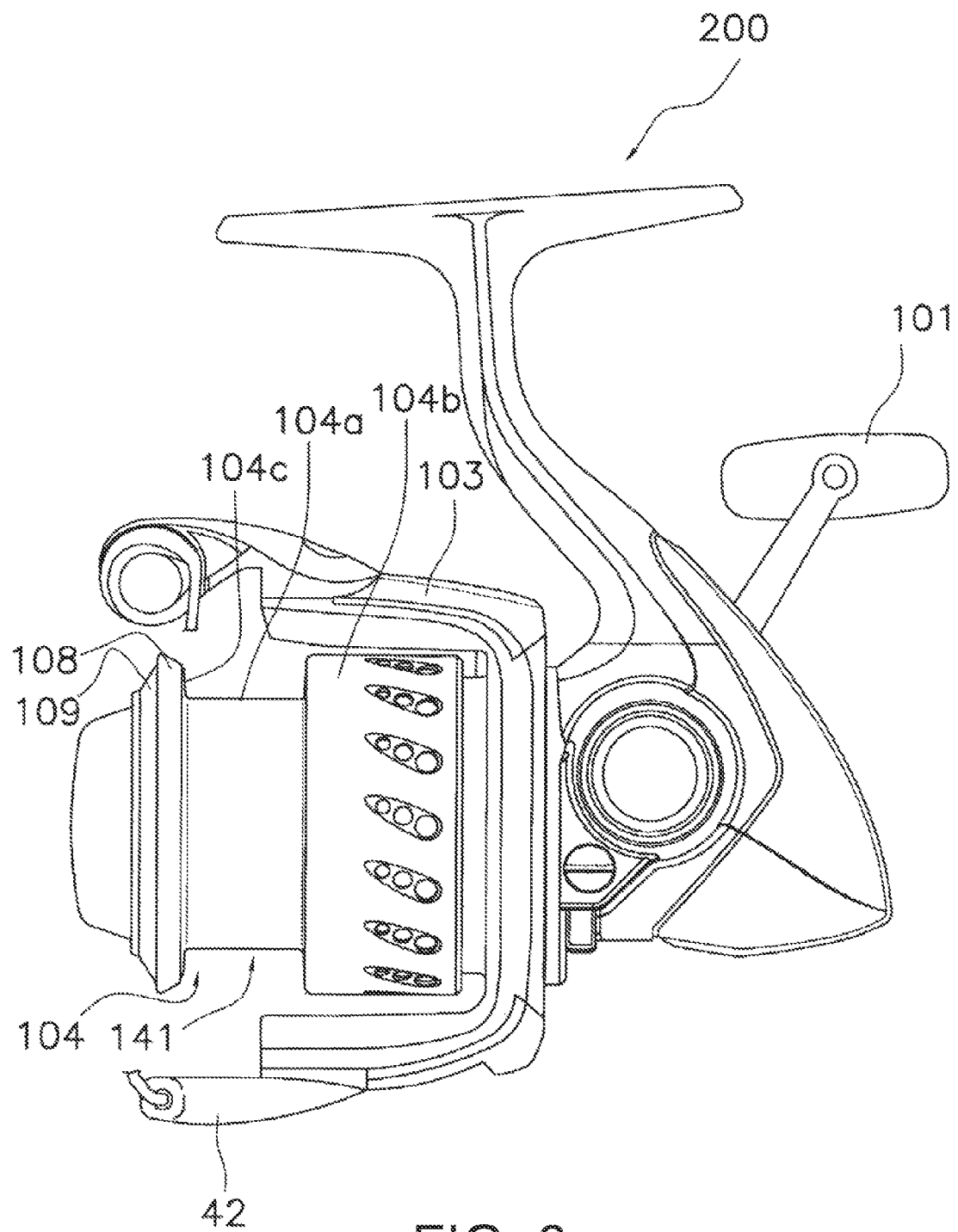
FIG. 6 is a side elevational view of a spinning reel according to a second embodiment of the present invention.

As illustrated in FIG. 6, the spool 104 is for winding fishing line on its outer circumferential surface and is disposed at the front portion of the rotor 103 to move in the longitudinal direction. The spool 104 includes a spool body 141, a ring member 108, a fastening member 109, and a coupling portion 40 (refer to FIG. 3) that couples the spool body 141 and the fastening member 109.

Figure 8A:
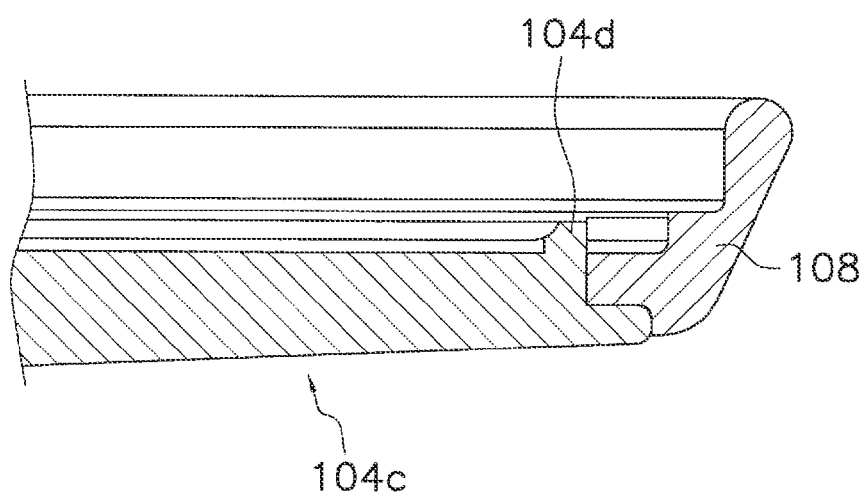
FIG. 8A is a partial cross-sectional view showing a state (a non-deformed state) in which the ring member is disposed on the front flange of the spool.
Figure 8B:
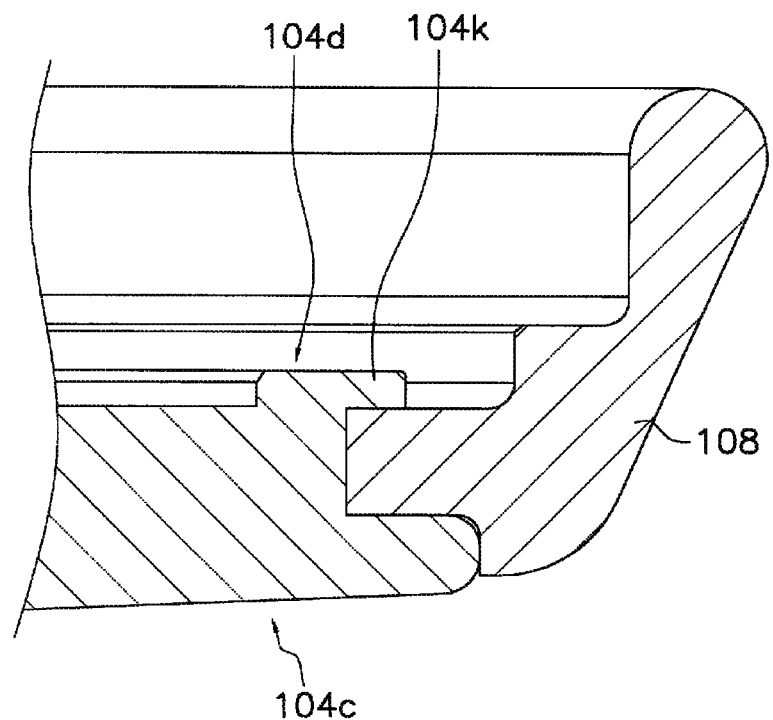
FIG. 8B is a partial cross-sectional view showing a state (a deformed state) in which the ring member is disposed on the front flange of the spool.

The spool body 141 comprises a fishing line winding drum portion 104a, a skirt portion 104b, a front flange portion 104c, and an annular protrusion 104d (refer to FIGS. 8A and 8B). Here, the body portion of the spool body 141 includes the fishing line winding drum portion 104a, the skirt portion 104b and the front flange portion 104c.

Figure 7:
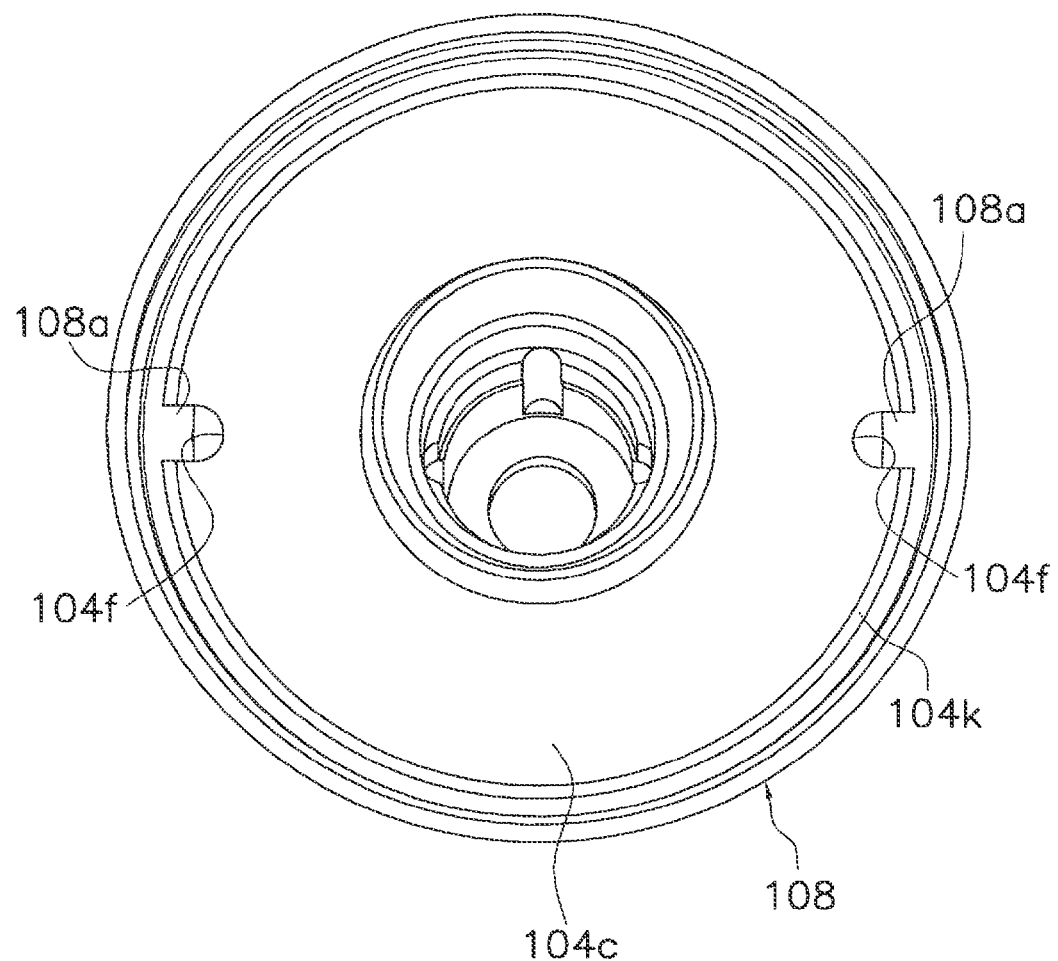
FIG. 7 is a front perspective view showing a state (a deformed state) in which a ring member is fixed to a front flange of a spinning reel spool of the spinning reel.

As illustrated in FIGS. 7, 8A and 8B, the front flange portion 104c extends radially outward from the front end portion of the fishing line winding drum portion 104a. The front flange portion 104c is integrally formed on the fishing line winding drum portion 104a. The front flange portion 104c has an annular protrusion 104d (refer to FIGS. 8A and 8B) and a pair of concave portions 104f (refer to FIG. 7). FIG. 7 is a view shown a state after deforming the annular protrusion 104d (a view after the plastic deformation), As illustrated in FIGS. 8A and 8B, the annular protrusion 104d is integrally formed on the front side of the front flange portion 104c. Specifically, the annular protrusion 104d protrudes forward from the front flange portion 104c. The annular protrusion 104d is not formed in the sections formed with the concave portions 104f. In other words, the annular protrusion 104d is a non-continuous ring that is made of two curved sections that are annularly arranged around the center axis of the spinning reel spool 104. The annular protrusion 104d is plastically deformable. Specifically, at least one portion of the annular protrusion 104d is plastically deformed by a pressing force. More specifically, all sections (the sections not formed with the concave portions 104f) of the annular protrusion 104d are deformed by a pressing force as illustrated in FIG. 7. Hereafter, all the deformed sections of the annular protrusion 104d (the plastically deformed sections) will be referred to as the deformed portion 104k (one example of the plastically deformed portion, and one example of the engaging part). Each of the two curved sections of the annular protrusion 104d includes the plastically deformed part 104k as curved arcs. A ring member 108 is disposed on the outer circumferential portion of the annular protrusion 104d.

Figure 9:
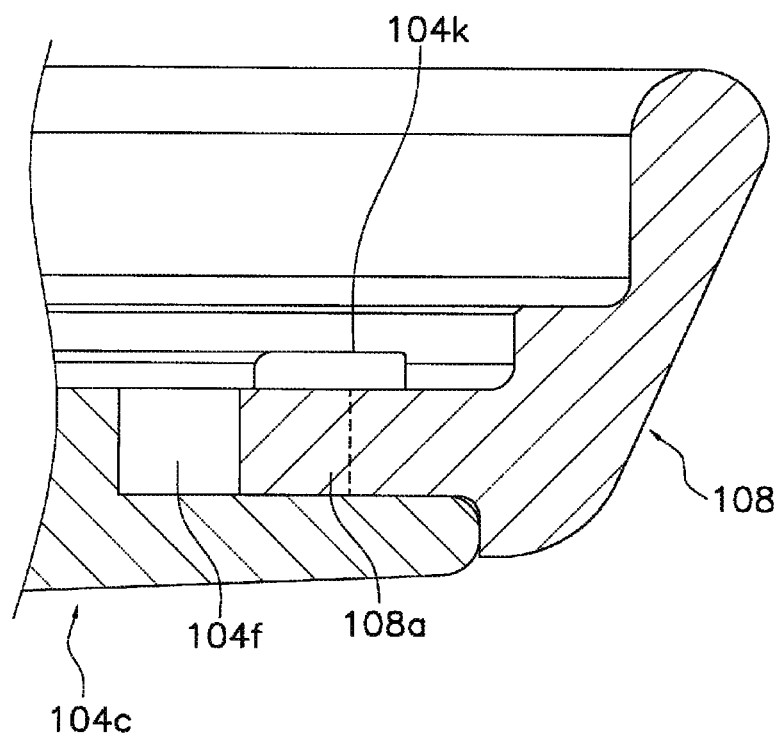
FIG. 9 is a partial cross-sectional view of a rotation regulating portion of the spool in a state (a deformed state) in which the ring member is disposed on the front flange.

As illustrated in FIGS. 7 and 9, the concave portions 104f are formed on the outer circumferential portion of the front flange portion 104c. Specifically, two concave portions 104f are formed on the outer circumferential portion of the front flange portion 104c. The two concave portions 104f are formed on the outer circumferential portion of the front flange portion 104c to oppose each other. The two concave portions 104f are respectively engaged by a convex portion 108a (to be described later) of the ring member 108. Specifically, the convex portions 108a of the ring member 108 and the concave portions 104f are fit together. Basically, the convex portions 108a are projections, while the concave portions 104f are recesses that mate with the convex portions 108a (projections). Accordingly, positioning the ring member 108 relative to the spool body 141 is achieved, and the rotation of the ring member 108 relative to the spool body 141 is regulated. Here, an example of a case of forming two concave portions 104f was shown. However, relative rotation of the ring member 108 with respect to the spool 104 can be accomplished by using at least one of the concave portions 104f and at least one of the convex portions 108a.

The ring member 108 is for guiding fishing line in the forward direction. The ring member 108 is disposed on and fixed to the outer circumferential portion of the front flange portion 104c. As illustrated in FIGS. 7 and 9, the ring member 108 has the convex portion 108a that engages the concave portion 104f of the front flange portion 104c. The convex portion 108a is formed on the inner circumferential portion of the ring member 108. Specifically, two convex portions 108a are formed on the inner circumferential portion of the ring member 108. The two convex portions 108a are formed on the inner circumferential portion of the ring member 108 to diametrically oppose each other. The two convex portions 108a and the concave portions 104f of the front flange portion 104c are fit together. Accordingly, positioning the ring member 108 relative to the spool body 141 is achieved. Namely, the rotation of the ring member 108 relative to the spool body 141 is regulated. By continuously deforming the annular protrusion 104d in the circumferential direction in this state, the ring member 108 is held between the deformed portion 104k of the annular protrusion 104d and the front flange portion 104c as illustrated in FIG. 7. Accordingly, the ring member 108 is fixed to the front flange portion 104c (the spool body 141).

Assembly of the Front Portion of the Spool

Here, the procedure for assembling the front portion of the spool 104 will be described. First, the ring member 108 is disposed on the front side of the front flange portion 104c of the spool body 141. Specifically, the ring member 108 is disposed on the front side of the front flange portion 104c on the outer circumferential portion of the annular protrusion 104d by fitting together respectively the two convex portions 108a of the ring member 108 and the concave portions 104f of the front flange portion 104c. Accordingly, the ring member 108 is positioned in the spool body 141 (the front flange portion 104c).

Next, in this state, a pressing force is applied to the annular protrusion 104d of the front flange portion 104c, and the annular protrusion 104d is deformed. Specifically, a pressing forces is applied continuously to the annular protrusion 104d of the front flange portion 104c, and the entire annular protrusion 104d is deformed. Accordingly, the ring member 108 is held between the deformed portion 104k of the annular protrusion 104d of the front flange portion 104c and the front flange portion 104c. Therefore, the ring member 108 is fixed to the spool body 141 (the front flange portion 104c), and the rotation is regulated.

Summary (1) The spool 104 in the second embodiment includes a spool body 141 and a ring member 108. The spool body 141 has a body portion (the fishing line winding drum portion 104a, the skirt portion 104b, and the front flange portion 104c) and an annular protrusion 104d. The annular protrusion 104d is integrally formed on the front side of the body portion, for example, on the front side of the front flange portion 104c. The annular protrusion 104d is plastically deformable. The ring member 108 is disposed on the outer circumferential portion of the annular protrusion 104d. The ring member 108 is held between the deformed portion 104k (the plastically deformed portion) of the annular protrusion 104d and the front flange portion 104c by plastically deforming the annular protrusion 104d by a pressing force.

In the spool 104 of the second embodiment, like in the first embodiment, the fastening member 109 does not need to make contact with the ring member 108. Therefore, a closed space is not formed according to the fastening member 109, the ring member 108, and the spool body 141. As a result, a foreign substance such as seawater or the like is not likely to be retained, and corrosion of the spool body 141 can be suppressed. Namely, with this spool 104, the durability of the spool can be enhanced.

Also, here the fastening member 109 is used as the lid member. Therefore, the fastening member 109 does not need to press the ring member 108. Accordingly, the fastening member 109 does not receive a reactive force from the ring member 108. As a result, even if the fastening member 109 is formed with a resin or the like, it is possible to prevent the deformation of the fastening member 109. Namely, in the spool 104 of the second embodiment, decreasing the weight of the spool and enhancing the durability of the spool can be achieved concurrently.

(2) In the spool 104 of the second embodiment, the spool body 141 (the front flange portion 104c) has a concave portion 104f. The concave portion 104f is formed on the outer circumferential portion of the spool body (the front flange portion 104c). The ring member 108 has a convex portion 108a that engages the concave portion 104f. By having the convex portion 108a engage the concave portion 104f, the rotation of the ring member 108 relative to the spool body 141 is regulated. Accordingly, the rotation of the ring member 108 and the fixation of the ring member 108 relative to the spool body 141 can be controlled concurrently just by deforming (plastically deforming) the annular protrusion 104d of the spool body 141.

(3) Like the spinning reel 100 of the first embodiment, as mentioned above, the spinning reel of the second embodiment includes the handle 101, the reel body 102, the rotor 103 and the spool 104. In this spinning reel 200, the durability of the spool can be enhanced.

Other Embodiments

An embodiment of the present invention was described above. However, the present invention is not limited to the embodiment described above, and various changes are possible without deviating from the essence of the invention. In particular, the many embodiments and modifications described in the specification can be optionally combined as needed.

(A) In the first embodiment, an example was described of a case wherein the rotation of the ring member 8 relative to the spool body 41 is regulated by forming two concave portions 8a in the ring member 8. However, the number of concave portions 8a is optional. Generally, the rotation of the ring member 8 relative to the spool body 41 can be regulated if at least one concave portion 8a is formed on the ring member 8.

(B) In the first embodiment, an example was described of a case wherein one portion of the annular protrusion 4d that is adjacent to the concave portion 8a and one portion of the annular protrusion 4d that is not adjacent to the concave portion 8a are deformed. However, it is possible to deform only one portion of the annular protrusion 4d that is adjacent to the concave portion 8a. Even in this case, fixing the ring member 8 to the spool body 41 and regulating the rotation of the ring member 8 relative to the spool body 41 can be achieved concurrently.

(C) In the first embodiment and the second embodiment, an example was described of a case wherein fastening member 9, 109 is used. However, the present invention is applicable even in a spinning reel 100, 200 that does not use a fastening member.

(D) In the first embodiment and the second embodiment, an example was described of a case wherein a coupling portion 40 is used. In addition to this, it is possible to form the fishing line winding drum portion 4a, 104a such that the coupling portion 40 and the fishing line winding drum portion 4a, 104a are integrally formed. For example, it is possible to integrally form the cylindrical portion (corresponding to the coupling portion 40) that extends forward from the fishing line winding drum portion 4a to be integral to the fishing line winding drum portion 4a, 104a. In this case, a male threaded portion (corresponding to the front portion of the male threaded portion 40b in the first embodiment) is formed on the outer circumferential portion of this cylindrical portion. A similar configuration to the first embodiment and the second embodiment can be obtained by screwing the second female threaded portion 19b of the fastening member 9 to this male threaded portion. Namely, even in this configuration, the same effects as those in the first embodiment and the second embodiment can be obtained.

Figure 10:
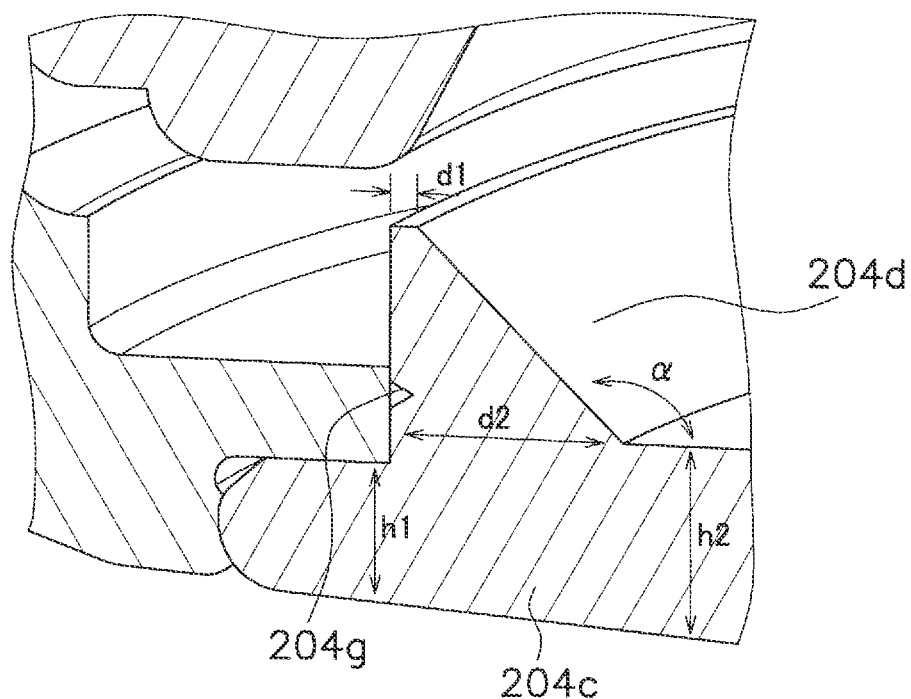
FIG. 10 is partially enlarged perspective view of a spinning reel spool according to another embodiment of the present invention.

(E) The annular protrusions 4d and 104d described in the first embodiment and the second embodiment can be configured as follows. As illustrated in FIG. 10, it is possible to form a V-shaped groove portion 204g on the outer circumferential portion of the annular protrusion 204d at a position forwardly spaced from the front flange portion 204c by a prescribed amount. By forming a V-shaped groove portion 204g on the outer circumferential portion of the annular protrusion 204d as described above, it is possible to plastically deform the annular protrusion 204d on the outer circumference side easily with this groove portion 204g as the reference point.

(F) The annular protrusions 4d and 104d described in the first embodiment and the second embodiment can be configured as follows. As illustrated in FIG. 10, it is possible to form the annular protrusions 4d and 104d such that the angle α formed by the inner circumferential portion of the annular protrusions 4d and 104d and the front portion of the front flange portions 4c and 104c is an obtuse angle. In other words, the annular protrusion 4d and 104d can be formed such that the thickness d1 in the radial direction at the extreme end portion of the annular protrusion 4d and 104d is made thinner than the thickness d2 in the radial direction at the base end portion of the annular protrusion. Accordingly, the extreme end portions of the annular protrusions 4d and 104d can easily be plastically deformed.

(G) The front flange portions 4c and 104c described in the first embodiment and the second embodiment can be configured as follows. The front flange portions 4c and 104c can be formed such that the thickness h2 at the section on the radially inward side of the front flange portions 4c and 104c is made thicker than the thickness h1 in the section on the radially outward side of the front flange portions 4c and 104c with the annular protrusions 4d and 104d as reference. Accordingly, a deformation, for example, an out-of-plane deformation in the longitudinal direction, of the section on the radially inward side of the front flange portions 4c and 104c can be prevented when a pressing force is applied to the annular protrusions 4d and 104d.

A wide range of applications of the present invention is possible for a spinning reel and a spinning reel spool.

What is claimed is:

1. A spinning reel spool that delivers fishing line forward, the spool comprising:
   a spool body having a body portion and a protruding portion integrally formed on a front side of the body portion as a one piece structure, the protruding portion protruding from the body portion in an axial direction of the spool body, and
   a ring member disposed on an outer circumferential surface of the protruding portion, the ring member being held between the body portion and a plastically deformed part of the protruding portion.

2. The spinning reel spool according to claim 1, wherein one of the ring member and the spool body has a concave portion,
   the other of the ring member and the spool body has an engaging part that engages the concave portion to limit rotation of the ring member relative to the spool body.

3. The spinning reel spool according to claim 2, wherein
the ring member includes an inner circumferential portion having the concave portion, and
the engaging part is a part of the plastically deformed part of the protruding portion to limit rotation of the ring member relative to the spool body.

4. The spinning reel spool according to claim 1, wherein
the outer circumferential surface of the protruding portion has a groove that is located at a position forwardly spaced from the body portion by a prescribed amount.

5. The spinning reel spool according to claim 1, wherein
the ring member is fixed to the spool body by the plastically deformed part, which is only partially disposed along the protruding portion.

6. The spinning reel spool according to claim 1, wherein
the protruding portion is an annular member extending around a center axis of the spinning reel spool.

7. The spinning reel spool according to claim 1, wherein
the protruding portion includes two curved sections that are annularly arranged around a center axis of the spinning reel spool, and each of the two curved sections including the plastically deformed part.

8. A spinning reel including the spinning reel spool according to claim 1, and further comprising:
a reel body;
a handle rotatably mounted to the reel body; and
a rotor operatively coupled between the handle and the spool to wind fishing line on the spinning reel spool.

9. A spinning reel spool that delivers fishing line forward, the spool comprising:
a spool body including a concave portion, and having a body portion and a protruding portion integrally formed on a front side of the body portion, the protruding portion protruding from the body portion in an axial direction of the spool body; and
a ring member having an engaging part that engages the concave portion to limit rotation of the ring member relative to the spool body, the ring member being disposed on an outer circumferential surface of the protruding portion, and the ring member being held between the body portion and a plastically deformed part of the protruding portion, the engaging part being a projection of the ring member that engages the concave portion.

10. A spinning reel spool that delivers fishing line forward, the spool comprising:
a spool body having a body portion and a protruding portion integrally formed on a front side of the body portion, the protruding portion protruding from the body portion in an axial direction of the spool body, and
a ring member disposed on an outer circumferential surface of the protruding portion, the ring member being held between the body portion and a plastically deformed part of the protruding portion, the protruding portion having an inner circumferential surface that is obtusely angled with respect to a front surface of the body portion that extends radially inward toward a center axis of the spinning reel spool.

11. A spinning reel spool that delivers fishing line forward, the spool comprising:
a spool body having a body portion and a protruding portion integrally formed on a front side of the body portion, the protruding portion protruding from the body portion in an axial direction of the spool body, and
a ring member disposed on an outer circumferential surface of the protruding portion, the ring member being held between the body portion and a plastically deformed part of the protruding portion,
the body portion having a first section extending radially inward toward a center axis of the spinning reel spool from the protruding portion, and a second section extending radially outward away from the center axis of the spinning reel spool from the protruding portion, the first section having a first thickness as measured in the axial direction, the second section having a second thickness as measured in the axial direction, the first thickness being greater than the second thickness.

\* \* \* \* \*